United States Patent [19]

Wilson

[11] Patent Number: 5,033,937
[45] Date of Patent: * Jul. 23, 1991

[54] CENTRIFUGAL PUMP WITH MODULAR BEARING SUPPORT FOR PUMPING FLUIDS CONTAINING ABRASIVE PARTICLES

[75] Inventor: Brown L. Wilson, Tulsa, Okla.

[73] Assignee: Oil Dynamics, Inc., Tulsa, Okla.

[*] Notice: The portion of the term of this patent subsequent to Oct. 10, 2006 has been disclaimed.

[21] Appl. No.: 328,209

[22] Filed: Mar. 24, 1989

Related U.S. Application Data

[63] Continuation of Ser. No. 64,685, Jun. 22, 1987, Pat. No. 4,872,808.

[51] Int. Cl.$^5$ .............................................. F04D 29/02
[52] U.S. Cl. ................................. 415/170.1; 415/180; 415/172.1; 415/901; 384/425
[58] Field of Search ............... 415/104, 105, 106, 107, 415/112, 113, 170.1, 172.1, 901; 384/97, 123, 368, 420, 425

[56] References Cited

U.S. PATENT DOCUMENTS

| 2,633,392 | 3/1953 | Luenberger | 415/501 X |
| 2,775,945 | 1/1957 | Arutunoff | 415/172 |
| 2,918,975 | 12/1959 | Conery et al. | 415/199.6 |
| 3,238,879 | 3/1966 | Shallenberg | 415/199.4 |
| 3,437,045 | 4/1969 | Tremain | 415/214 |
| 3,716,309 | 2/1973 | Mitchell | 417/422 |
| 3,746,461 | 7/1973 | Yokota et al. | 415/104 |
| 3,951,573 | 4/1976 | Dunning et al. | 415/104 X |
| 3,960,468 | 6/1976 | Boorse et al. | 415/104 X |
| 4,120,606 | 10/1978 | Reiss | 415/199.1 |
| 4,130,325 | 12/1978 | Schultenkamper | 384/425 |
| 4,152,092 | 5/1979 | Swearingen | 415/172 R X |
| 4,172,690 | 10/1979 | Kuntz | 415/199.2 |
| 4,332,524 | 6/1982 | Smith | 415/176 |
| 4,511,307 | 4/1985 | Drake | 415/172 R |
| 4,728,201 | 3/1988 | Abbe | 384/123 X |

FOREIGN PATENT DOCUMENTS

| 2600759 | 7/1977 | Fed. Rep. of Germany | 384/425 |
| 730072 | 8/1932 | France | 415/104 |

*Primary Examiner*—Thomas R. Hannon
*Attorney, Agent, or Firm*—Head & Johnson

[57] ABSTRACT

A submersible centrifugal pump is disclosed. It includes a housing with a linear stack of axially mounted pumping units therein. Each unit constructed as a module with at least a first and a second impeller mounted to a central shaft. A diffuser forms an outer casing which is provided for each impeller. A thrust bearing, lubricated and cooled by the fluid being pumped is supported from and to the outer casing and is arranged to receive axial force from the upstream impellers in each modular unit. A plurality of impellers and diffusers can form a single modular unit.

14 Claims, 8 Drawing Sheets

CENTRIFUGAL PUMP WITH MODULAR BEARING SUPPORT FOR PUMPING FLUIDS CONTAINING ABRASIVE PARTICLES

This is a continuation of co-pending application Ser. No. 07/064,685 filed on June 22, 1987 U.S. Pat. No. 4,872,808.

DISCLOSURE STATEMENT

A preliminary patentability search revealed the following U.S. Patents:
- U.S. Pat. No. 2,918,975— Conery et al
- U.S. Pat. No. 3,238,879— Shallenberg
- U.S. Pat. No. 3,437,045— Tremain
- U.S. Pat. No. 3,716,309— Mitchell
- U.S. Pat. No. 4,120,606— Reiss
- U.S. Pat. No. 4,172,690— Kuntz
- U.S. Pat. No. 4,332,524— Smith
- U.S. Pat. No. 4,511,307— Drake These patents all relate to some type of pump for pumping fluids. For example, the Conery et al patent shows a multi-stage pump. The Shallenberg patent discusses a submersible pump having a plurality of linerally stacked pumping units. The Tremain patent relates to a plurality of stacked plastic cases. The Mitchell patent is a submersible motor and pump unit. The Reese patent is directed to the concept of improved means for connecting the end portions of the pump housing and its adjacent components. The Smith patent shows a single sleeve bearing 54. The Kuntz patent is for arrangement for centering the impellers in a multi-stage centrifugal pump. The Smith patent shows a sleeve bearing and filter for reducing the wear on a submersible electric pump. The Drake patent includes a rotatable impeller and fixed diffuser and has a bearing that is constructed from a hardness greater than the hardness of sand.

FIELD OF THE INVENTION

This present invention relates to a multi-stage centrifugal pump with spacial modular construction and a spacial bearing for absorbing the thrust generated by the impeller stages in each module.

BACKGROUND OF THE INVENTION

Multi-stage centrifugal pumps are well known in the art and are generally comprised of a number of impellers which impart pressure and kinetic energy to a fluid which is being pumped and also includes a diffuser between impellers which guide the fluid to and from the impellers. An impeller and a diffuser comprises one "stage". Rotation of the impellers causes fluid to be pumped in one direction, e.g., upwardly and as it is pumped it develops a pressure differential which tends to force the impellers in a reverse direction, e.g. downward which is called "down thrust". These centrifugal pumps are widely used for submersible pumping of fluid from a well bore and in which the housing of the centrifugal pumps are cylindrical and are placed in a vertical position with the fluid entering the bottom of the pump and going out the top. This "down thrust" is absorbed by bearings, located either externally or within each diffuser of the pump.

In one embodiment in order to transfer the thrust to an external bearing, the impellers are fixed axially to the shaft. This is commonly known as a "fixed impeller" pump. If the generated thrust is to be absorbed by a bearing in the stage itself, the impellers are not fixed axially to the shaft in order that each impeller may run on its individual thrust bearing. This type is commonly known as a "floating impeller pump". When pumping fluids from great depths, i.e., deep wells or against higher pressures, the "fixed impeller" pumps are at a disadvantage because of the limitation of the amount of thrust which can be transmitted down the shaft, or by the thrust capacity of the external bearing. When pumping fluids containing abrasive particles, such as sand, the "floating impeller" pumps are at a disadvantage because of the bearing wear due to these particles in the fluid. In situations where the pumps must deliver fluids containing abrasive particles from great depths, such as submersible oil field pumps, the pumps traditionally suffer extremely short lives. The use of bearing materials which are significantly harder than the abrasive in the "floating impeller" pumps have increased the pump life, but at an expense that is seldom justified.

It is therefore an object of the present invention to describe a multi-stage centrifugal pump having a novel means of transferring the down thrust from a plurality of impellers to a special bearing that is designed to operate in and be lubricated by the fluid being pumped.

SUMMARY OF THE INVENTION

The present invention provides a multi-stage centrifugal pump with a modular thrust bearing which absorbs all of the thrust generated by the impellers in that module. The maximum pump pressure is therefore not limited by the thrust. The thrust bearing is lubricated by the fluid being pumped.

The centrifugal pump is made up of a plurality of axially aligned modules with each module having a fluid conveying passageway and an axial bore. A shaft extends through the bores and the pump impellers are attached so that the rotation of the shaft is transmitted to the impellers. Each module has a plurality of impellers and mating diffusers which when fit together form a casing. Each impeller has a hub and they are so arranged that the thrust developed by one of the impellers is transmitted to the hub of the impeller immediately below it and finally to the modular thrust bearing to receive the thrust for all the impellers in the particular module.

The modular thrust bearing has a rotating member which is rotatably supported by the shaft. The rotating bearing surface contacts a fixed stationary bearing member which is supported from and to the casing formed by the diffusers and provides an annular cavity for fluid passage and transferring the thrust developed by the impellers of the module to the casing. Several different designs of the thrust bearing are disclosed. The modules, which may be a plurality, are retained within a pump housing.

DETAILED DESCRIPTION

Figure 1:
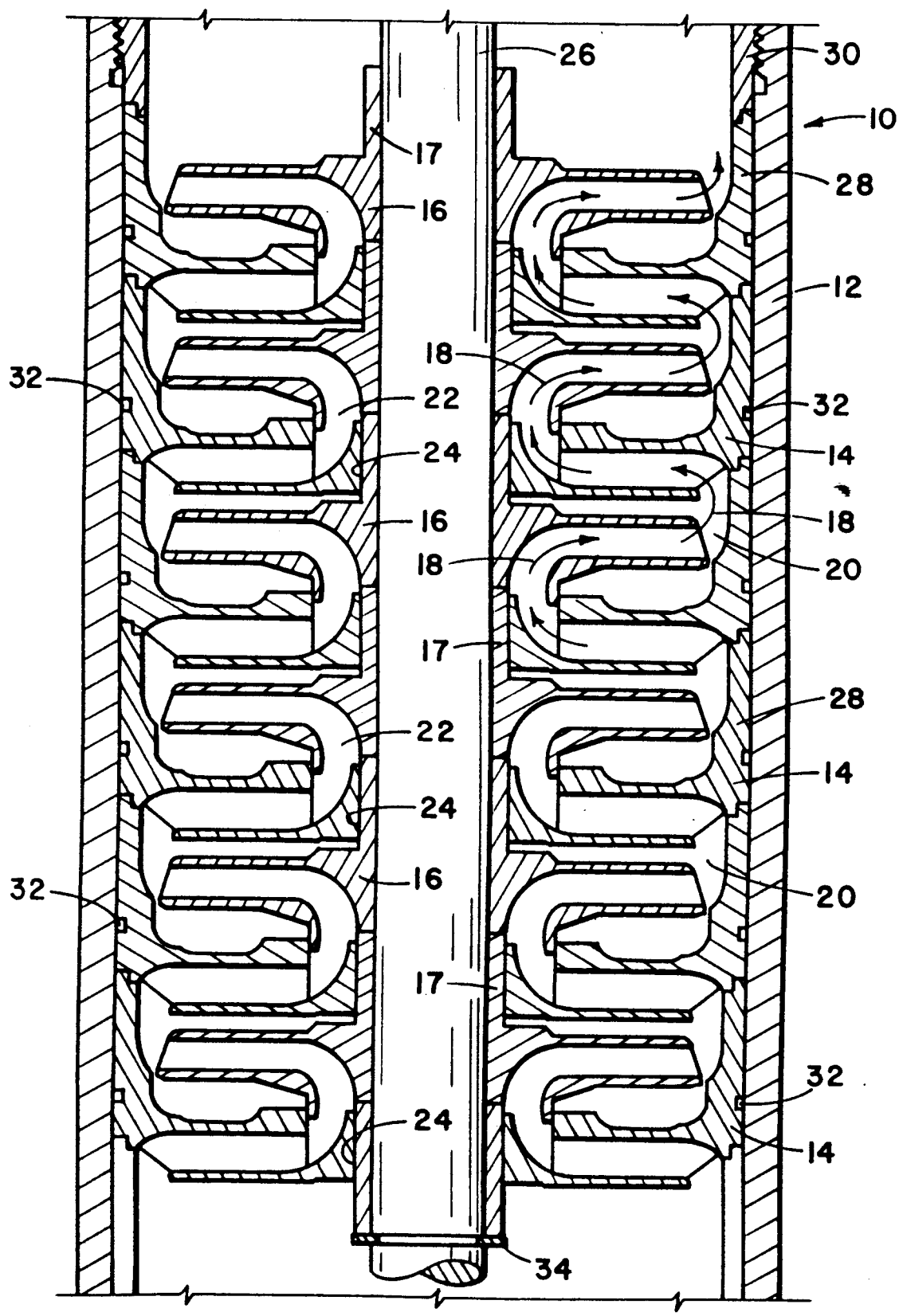
FIG. 1 is a sectional view of a prior art "fixed impeller" pump.

It is considered that a brief review of the prior art showing a "fixed impeller" and a "floating impeller" type centrifugal pump will be helpful in understanding improvements provided by the present invention. In this regard attention is first directed to FIG. 1 which shows a prior art "fixed impeller" type multi-stage centrifugal pump which is generally identified by the reference character 10. The pump 10 includes an outer housing 12 having diffusers 14 which are constructed to provide a circuitous passageway as shown by arrows 18 from the outer periphery 20 of adjacent rotating impellers 16 to the inner periphery or eye 22 of the next impeller. One impeller and one diffuser form one pump stage. Each diffuser is formed of an inner bore 24 through which each impeller axially extends. The outer portion of each diffuser forms an outer casing 28 which are retained together in compression by upper and lower threaded sleeves 30. Grooves 32 and O-rings therein provide a seal with housing 12. A shaft 26 extends through the bore 24. The impellers 16 are each fixed to the shaft 26, e.g., by a keyway, not shown, with an inner hub 17, and are spaced between diffusers 14. When the shaft 26 rotates it rotates the impellers 16 therewith. Fluid is drawn upward and forced through the circuitous fluid passageways as shown by the arrows 18. In order to increase the head or pressure produced a large number of stages may be stacked on each other as shown in FIG. 1.

As can be seen in FIG. 1 the hubs 17 of the impellers seat against each other in order that the thrust generated is transferred down the impeller stack through the hubs until it reaches thrust retaining ring 34 which is secured to shaft 26 where the thrust is thus transferred to the shaft. The thrust is finally absorbed in a sealed lubricating thrust bearing, not shown, below the pump.

Figure 2:
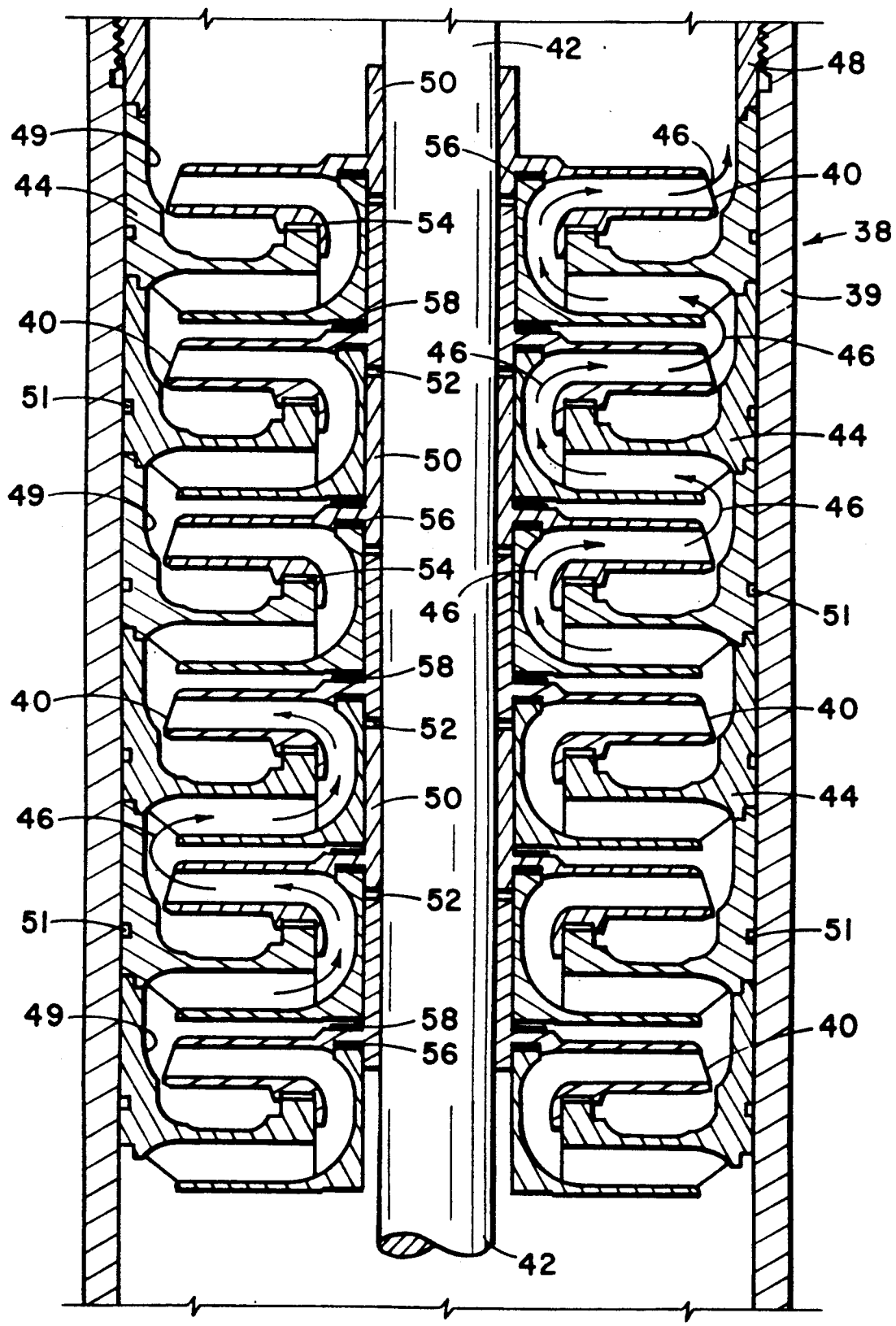
FIG. 2 is a sectional view of a prior art "floating impeller" pump.

FIG. 2 represents the prior art showing a "floating impeller" pump generally designed at 38 in a housing 39. Shown thereon are impellers 40 which are keyed to shaft 42 yet capable of relative vertical movement thereto. As in the "fixed impeller" type each impeller 40 is rotatably positioned relative to and between stationary diffusers 44 creating a circuitous passageway for the fluid being pumped as shown by arrowed lines 46. As previously described in FIG. 1, the diffusers are retained in a housing 39 by threaded upper (and lower) retainers 48, the outer casing 49 of each being sealed at grooves 51 by O-rings. The actual pumping operation is similar to that of the device of FIG. 1 in that the fluid being pumped is drawn up through the circuitous fluid passageway 46 in the impellers and diffusers. However, in the embodiment of FIG. 2 the hubs 50 of the impellers 40 are slightly separated from each other by a space 52. Thus, none of the thrust generated by the pumping of the fluid is transferred to the shaft 42. Each impeller 40 is provided with lower down-thrust washers or bushings 54 and 56 and up-thrust washers and bushings 58, which rotate relative to adjacent surfaces on the diffuser. As each impeller 40 is rotated a pressure differential develops between the outlet and the inlet which tends to drive the impeller 40 downwardly. This action, combined with abrasive laden fluids, prematurely wears out the down-thrust washers or bushings 54 and 56. Forming the washers of exotic or hardened materials as in the prior art (See U.S. Pat. No. 4,511,307) does not necessarily provide a satisfactory solution.

Figure 3:
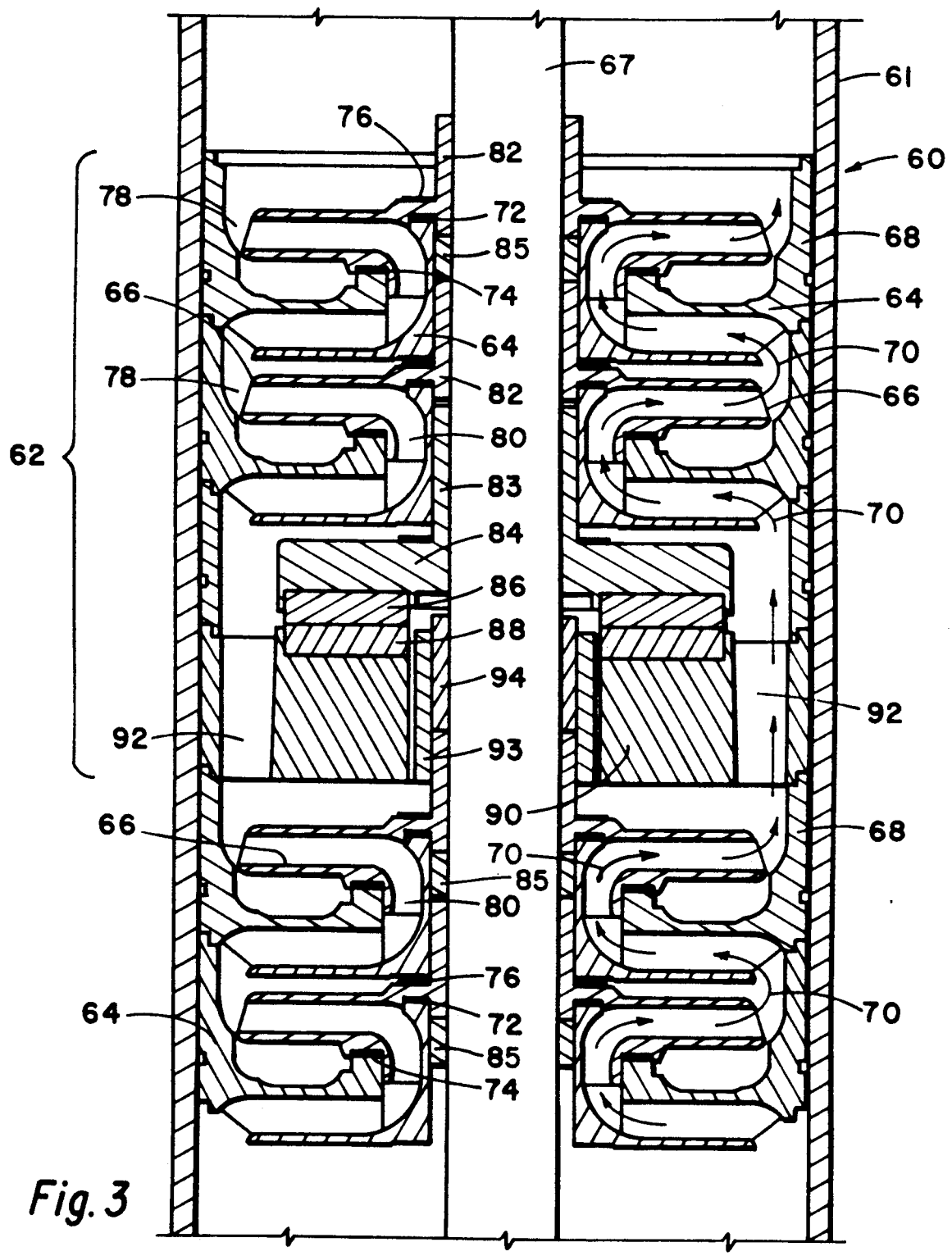
FIG. 3 is a sectional view of a portion of a multi-stage centrifugal pump embodying the present invention.

Attention is next directed to FIG. 3 which shows a preferred embodiment of the invention. Reference numeral 60 generally indicates a multi-stage centrifugal pump within a housing 61. Depending upon the design pressure required, the pump is comprised of one or more modules 62. Each module 62 will include one or more pump stages formed by a diffuser 64 and an impeller 66, the latter of which is attached to rotary shaft 67. The diffusers 64 are formed with nestable outer casings 68 which are retained in housing 61 as shown in the prior art. Similary the combination of rotary impellers 66 and diffusers 64 create the circuitous flow passage 70 for the fluid being pumped similar to that shown in FIGS. 1 and 2. Each impeller 66 is provided with a plurality of lower down-thrust bushings 72 and 74 and up-thrust bushings 76. As the impeller 66 is rotated, a pressure differential develops between a high pressure side 78 and a low pressure side 80 of the impeller 66 which tends to drive the impeller 66 downwardly prematurely wearing out the lower down-thrust bushings 72 and 74. The embodiment of the present invention illustrated in FIG. 1 provides a novel means to absorb "down thrust" and prevent the premature failure of the bushing and seal surfaces.

Each impeller 66 has a hub 82 which is keyed to the shaft 67 as a floating impeller, i.e., capable of vertical movement. The hubs 82, once the down-thrust force has 'worn-in' the bushings or washers 72 and 74, will transmit the down-thrust from hub-to-hub to a hub 83 of a thrust disc 84 which surrounds shaft 67 and is rotatable therewith. In some instances spacers or shims 85 are used between hubs. Like the impellers 66, hub 83 can move longitudinally with respect to shaft 67. Thus, the thrust disc 84 rotates with the shaft 67 and transmits the thrust and rotation to a thrust bearing surface 86 which is fixed to thrust disc 84. The rotating thrust bearing surface 86 runs against the stationary thrust bearing surface 88 which is lubricated and cooled by the fluid being pumped and supported by a bushing carrier 90. Annular cavities 92 in the bearing carrier 90 allow for the passage of fluid from either the pump suction, or as shown, from the outlet of the topmost impeller 66 in the module below. An elastomeric radial bearing member 93 which contacts sleeve 94 provides radial support for the pump shaft. If desired the radial bearing 93 could be in direct contact with the shaft 67. Because the thrust bushing carrier 90 is assembled as part of the nested outer casings 68 of diffusers 64, the resultant down-thrust is transferred to those casings.

Although the ability of the modular bearing described above in regard to FIG. 3 to function as described above does not rely upon a specific configuration of the module thrust bearing there are some configurations of the bearing that, for a particular operating environment, will have a greater useful operation life than others. FIGS. 4A through 10A show some of these configurations, and like numerals are used where like parts are previously described.

Figure 4A:
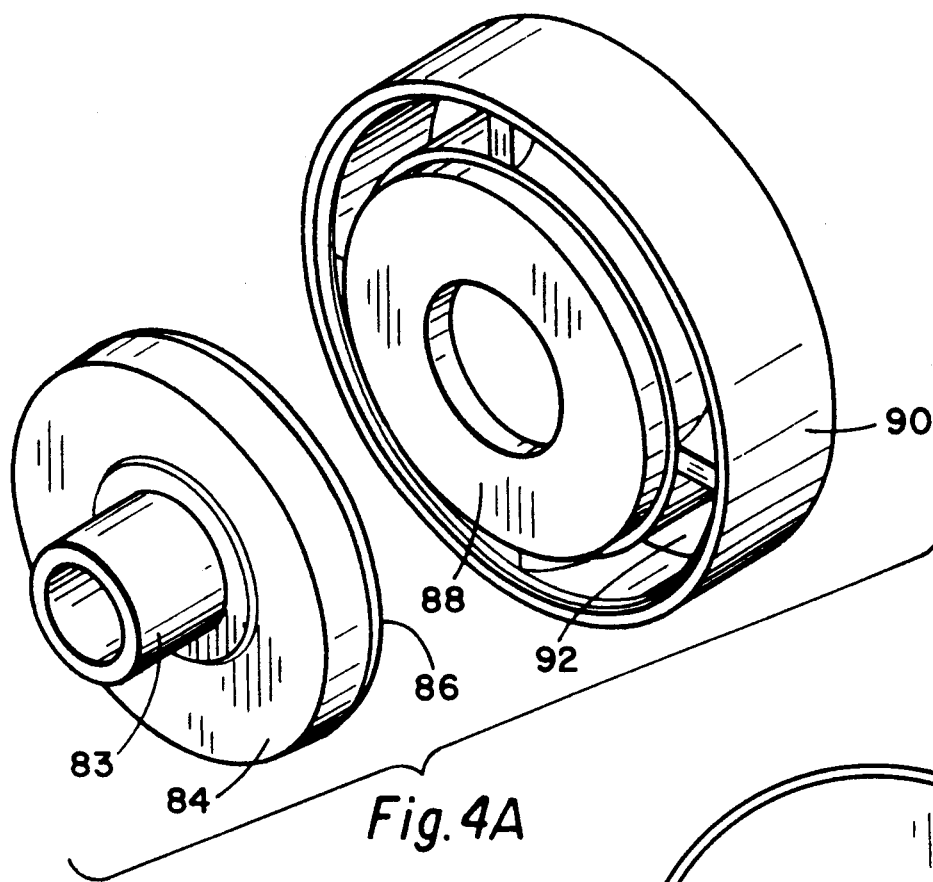
FIG. 4A is an exploded view showing the rotating thrust disc and the flat stationary thrust bearing of the bearing assembly.
Figure 4B:
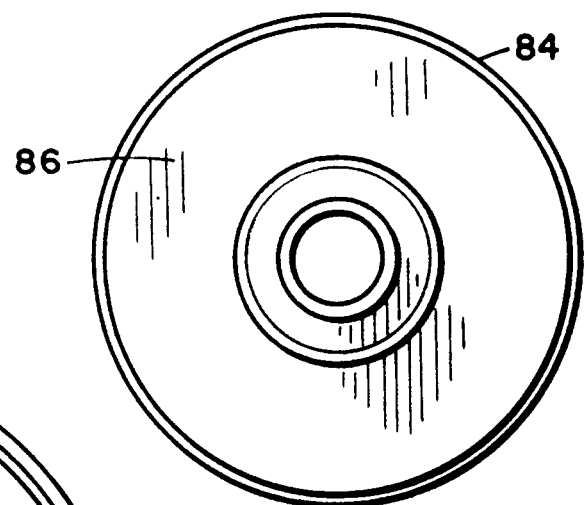
FIG. 4B is a full face view of the bearing surface of the rotating thrust disc of FIG. 4A.
Figure 4C:
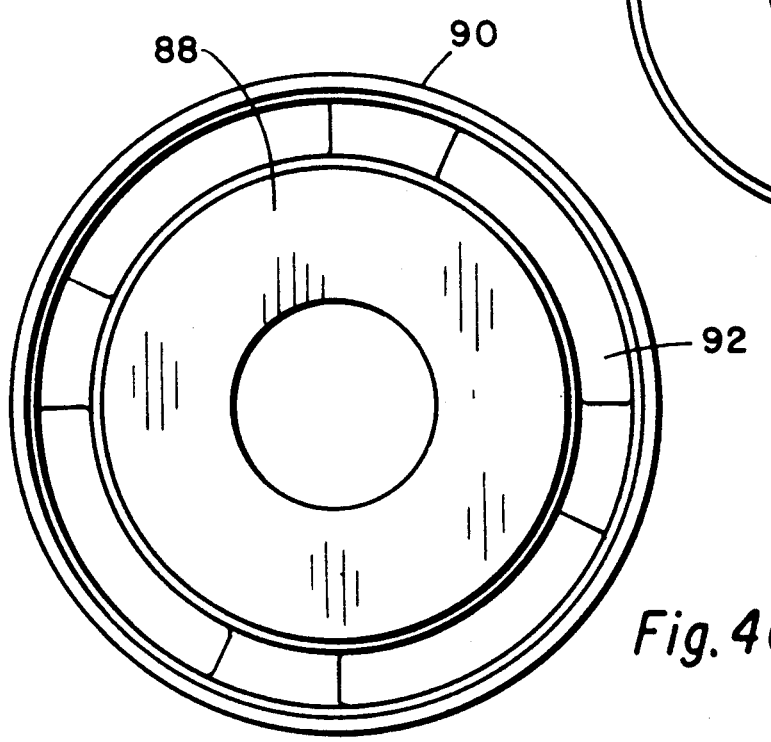
FIG. 4C is a full face view of the stationary thrust bearing of FIG. 4A.

FIGS. 4A, 4B AND 4C show perhaps the simplest form of the thrust bearing. This includes a rotating thrust disc 84 and its bearing surface 86. It also includes a flat stationary thrust bearing surface 88 and its carrier 90. In use as the bearing surfaces are lapped flat, this configuration tends to limit the entrance of abrasive particles into the bearing area because of the extremely thin layer of lubricating fluid between bearings 86 and 88. This particular configuration of FIG. 4A does have limitations because it can require greater torque than some of the configurations discussed hereinafter because of limitation in lubrication inherent in flat thrust bearings. Because of this the bearing is limited to low loads.

Figure 5:
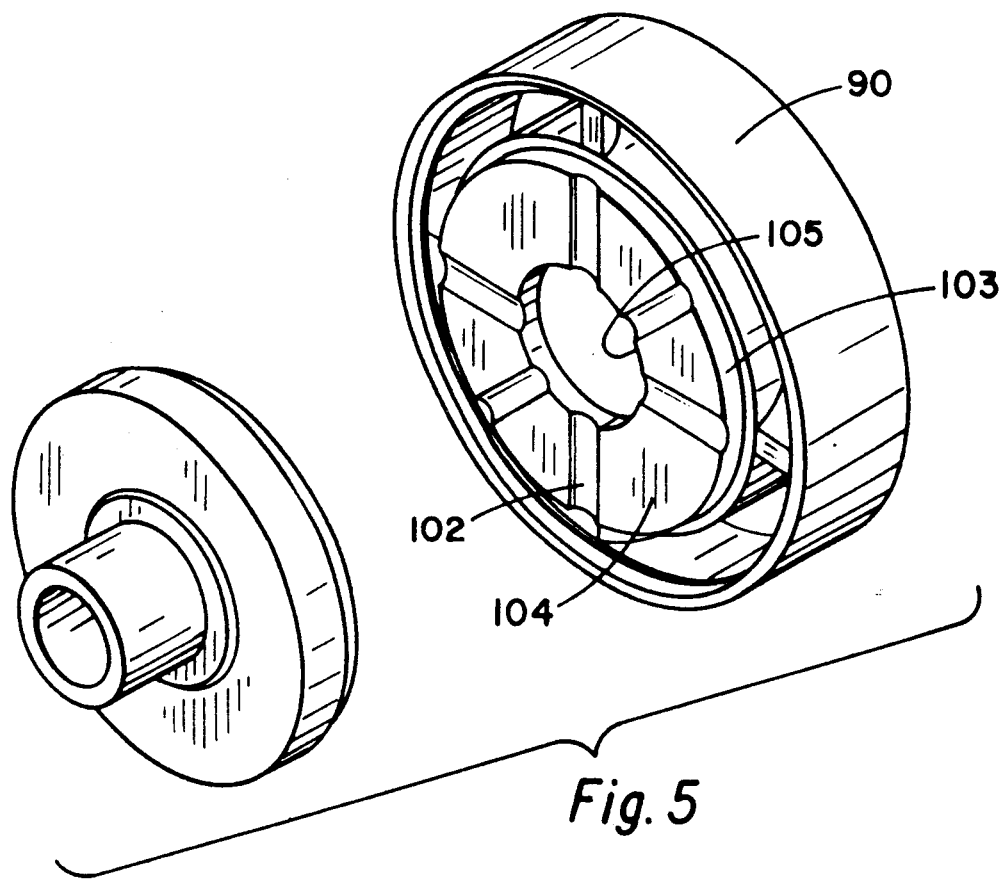
FIG. 5 is similar to FIG. 4A except that the stationary thrust bearing is provided with lubricating grooves.

FIG. 5 is similar to the bearing of FIG. 4A except for the provision of lubricating grooves 102 in the face 104 of carrier 90 from the outer periphery 103 to the inner periphery 105. These grooves provide the means for better lubrication allowing the bearings to run cooler and carry greater loads than the flat faced bearings of FIG. 4. It should be noted that the bearing will have similar functions if the groove face is a part of the rotary thrust bearing surface 86 or if both bearing surfaces have grooves.

Figure 6:
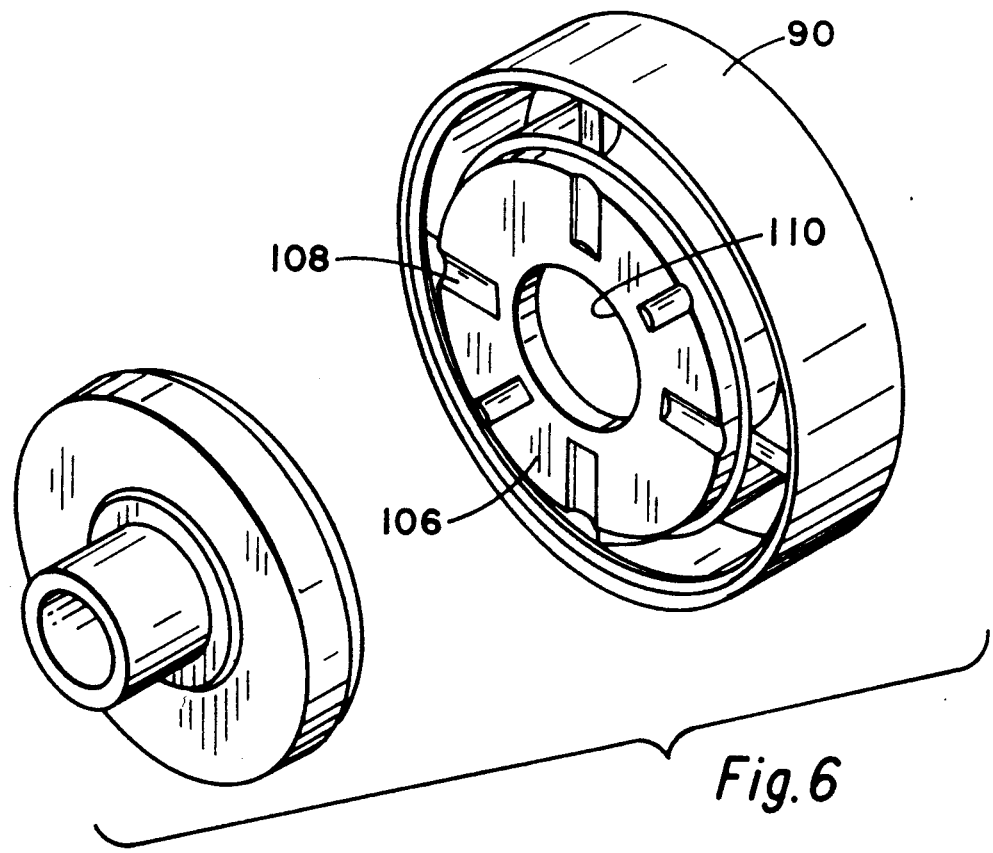
FIG. 6 is similar to FIG. 5 showing modified lubricating grooves in the stationary thrust bearing surface.

FIG. 6 shows a stationary thrust bearing 106 with lubricating grooves 108 which is held in carrier 90. In this embodiment the grooves 108 do not extend all the way across the bearing surface to the inner periphery 110. A major advantage is that the partial grooves act as seals to exclude the abrasive particles from the bearing surface.

Figure 7:
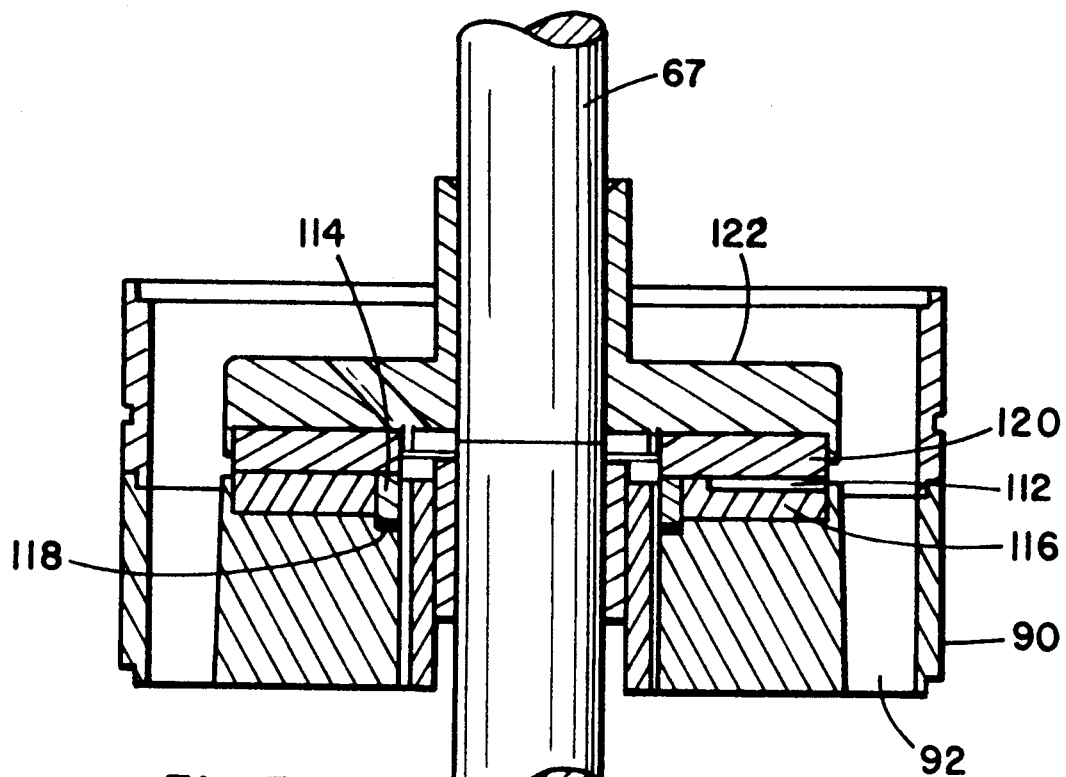
FIG. 7 is a sectional view showing a modified rotating thrust disc and the stationary thrust bearing assembly.

Attention is next directed to FIG. 7 which shows an alternate embodiment of a partial groove stationary bearing having lubrication grooves 112. A seal ring 114 is located at the inside diameter or periphery of the stationary bearing surface 116. An elastomeric spring 118 restricts the thrust force transferred from the carrier 90 to the sealing ring 114. Seal ring 114 runs against the flat face 120 of the rotating bearing 122 thus preventing abrasives from entering the bearing area. Similarly as with the other embodiments discussed above the rotating and stationary elements of the bearing seal arrangement may be interchanged.

Figure 8:
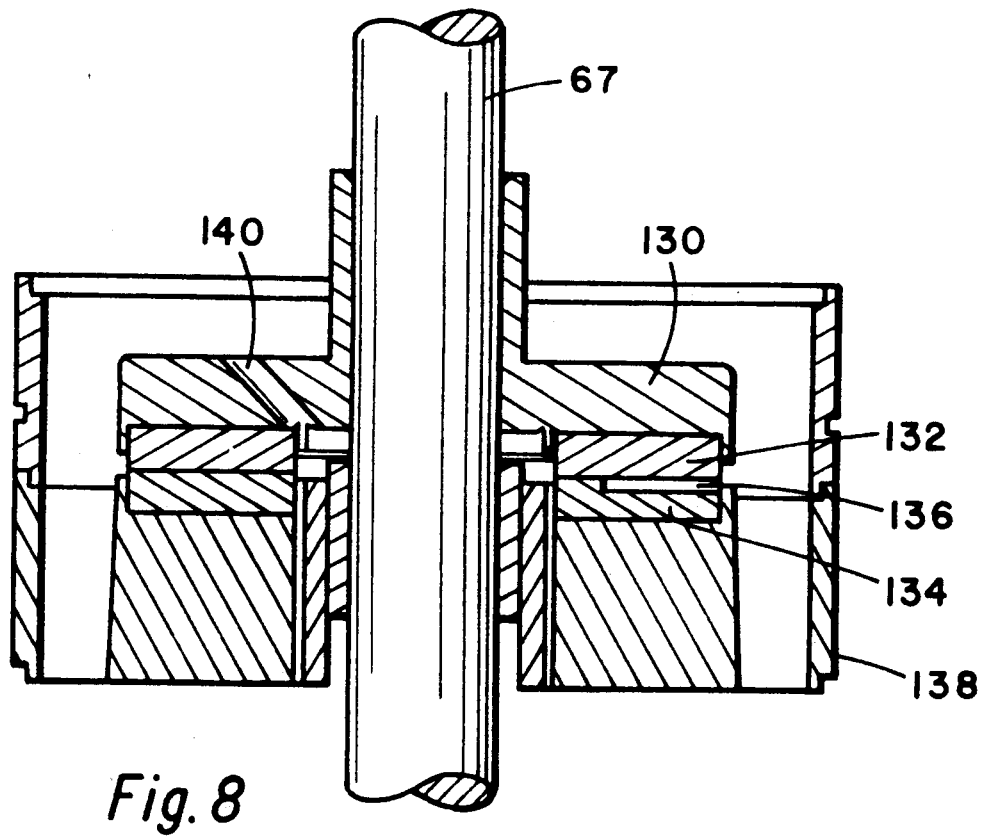
FIG. 8 is a sectional view of a modified bearing assembly.

FIG. 8 shows still another embodiment of the thrust bearing assembly. Shown thereon is a rotating thrust disc 130 with its bearing 132 and a stationary thrust bearing 134 with lubricating grooves 136 in its carrier 138. Abrasive evacuation holes 140 are provided in the rotating thrust disc 130. When rotating thrust disc 130 rotates these evacuation holes 140 act as small centrifugal pumps circulating the fluid and removing the abrasive particles from the inside of the bearing. This prevents these particles from collecting and causing damage and wear disproportionate to their actual concentration in the pump fluid.

Figure 9:
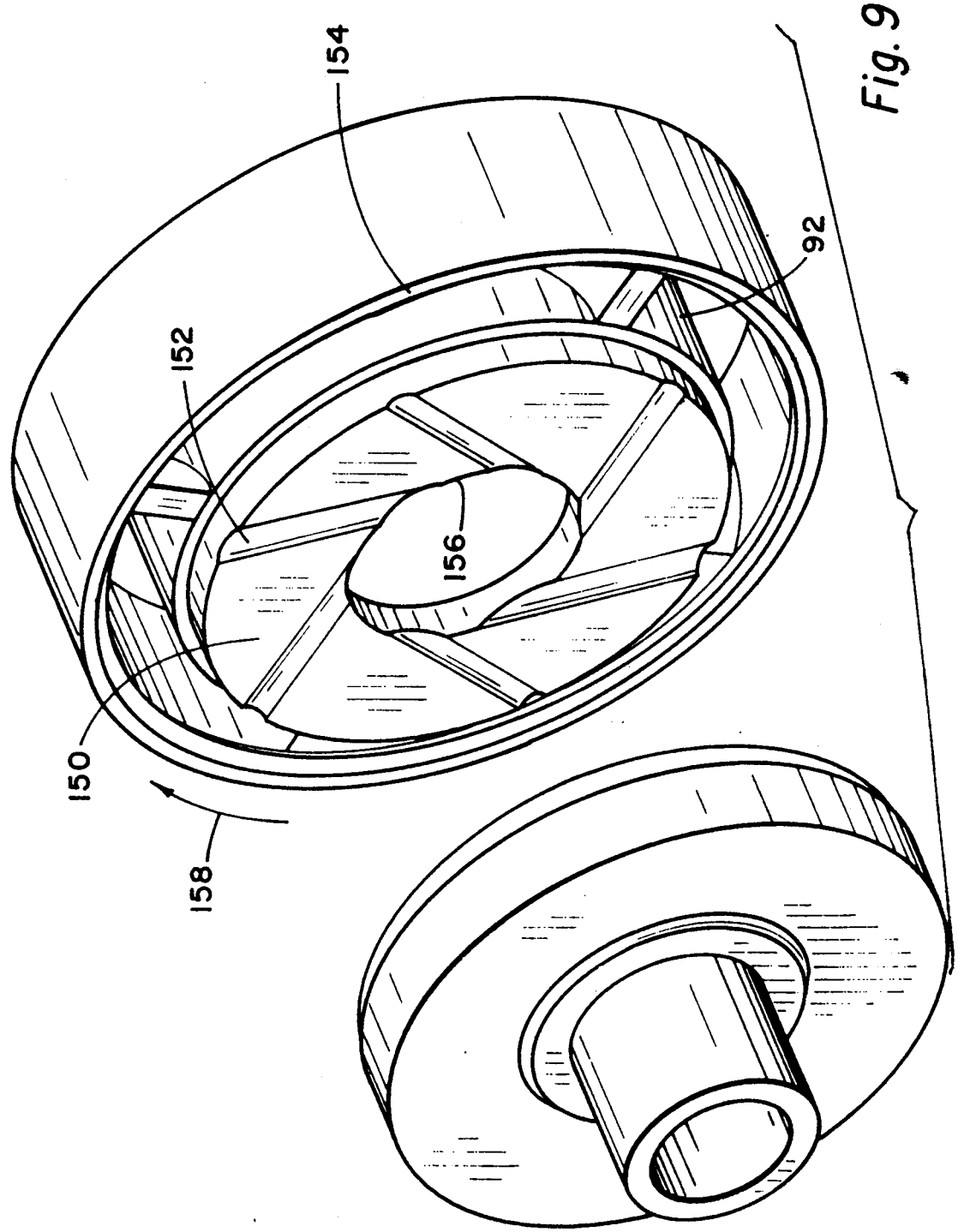
FIG. 9 is a full face view of a modified stationary thrust bearing.

Another embodiment of the thrust bearing assembly is shown in FIG. 9. A stationary thrust bearing surface 150 is shown with angular spaced lubricating grooves 152 and its carrier 154. Grooves 152 function similar to the grooves shown in FIG. 5. Grooves 152 are tangential to the periphery of the bore 156 which generally extend into the direction of rotation 158 of the rotating thrust disc, not shown in this view. These grooves thus offer no corners in the direction of rotation for the abrasive material to erode. As these grooves extend inwardly from the outside and generally the direction of rotation abrasive particles in the lubricating grooves tend to be carried to the inside of the thrust bearing where they can be removed by evacuation holes such as shown in FIG. 8.

Figure 10:
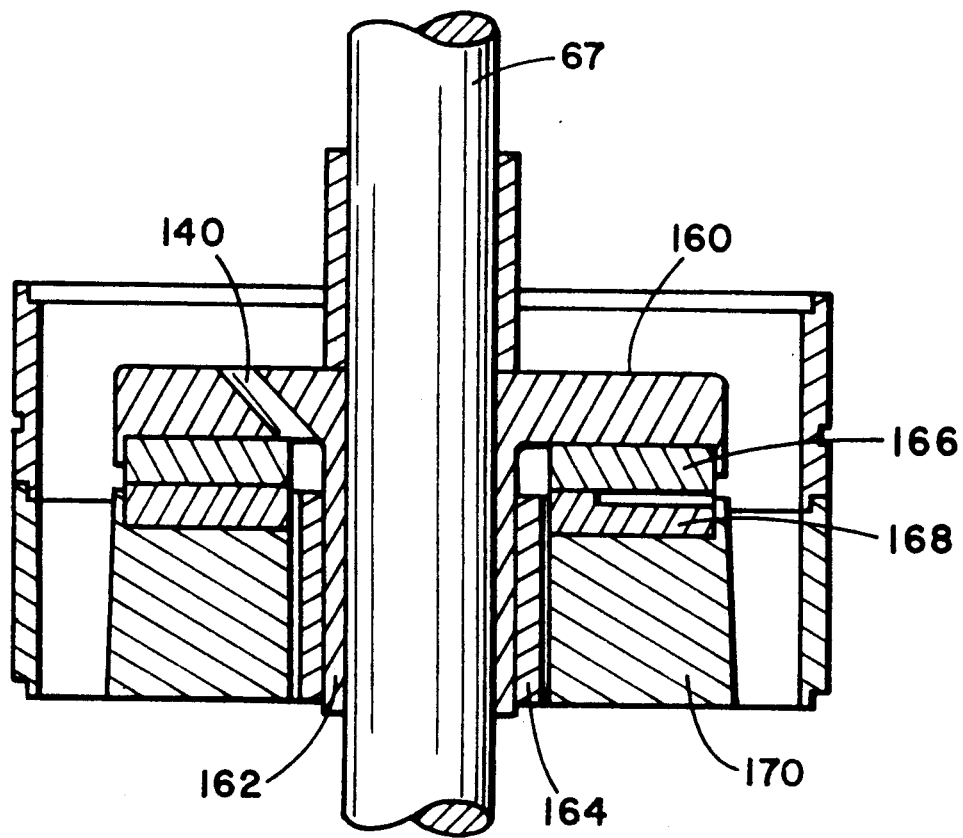
FIG. 10 is a sectional view of another embodiment of a thrust bearing assembly.

Attention is next directed to FIG. 10. This assembly is another embodiment where a rotating thrust disc 160 is formed with a downward hub 162 about shaft 67 which is radially supported by bearing 164. Disc 166 is supported to the disc 160 while disc 168 is supported by the carrier 170.

The particular thrust bearing assembly can be selected by a skilled designer of the centrifugal pumps such as described above so that the most efficient thrust bearing will be selected as may be needed for the particular fluid being pumped. This would take into account the abrasive particles contained in the fluids, pressures to be developed and the rate of flow.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A submersible pump for pumping fluids which may contain abrasives, which pump comprises:
   a plurality of diffusers which form an outer casing;
   a shaft rotatably mounted in the center of said diffusers;
   a thrust bearing attached to said shaft for rotation therewith:
   a plurality of impellers coactable with said diffusers to form a plurality of pump stages, each impeller having a hub which is rotatable with said shaft, each impeller being axially moveable along said shaft whereby, during said pumping of said fluids, axial down-thrust is transmitted from hub to hub to said thrust bearing;
   a stationary thrust bearing having a bearing surface in contact with said thrust bearing, said stationary thrust bearing being supported to said outer casing, whereby said axial down thrust is transferred to said outer casing.

2. The pump of claim 1 wherein said bearing surface of said stationary thrust bearing has an annular cavity for the axial passage of said fluids being pumped.

3. The pump of claim 1 wherein said bearing surface includes at least one lubricating groove.

4. The pump of claim 3 wherein said at least one lubricating groove extends radially.

5. The pump of claim 3 wherein said at least one lubricating groove partially extends radially from an outer periphery of said stationary thrust bearing.

6. The pump of claim 3 wherein said at least one lubricating groove extends angularly so as to be substantially tangential to said shaft and oriented in a direction opposite that of said rotatable thrust bearing.

7. The pump of claim 3 including at least one evacuating hole extending through said rotatable thrust bearing, said hole slanting upwardly and outwardly from a position adjacent said shaft.

8. The pump of claim 1 including a housing within which said outer casing is affixed.

9. The pump of claim 8 wherein said bearing surface of said stationary thrust bearing has an annular cavity for the axial passage of said fluids being pumped.

10. The pump of claim 9 wherein said bearing surface includes at least one lubricating groove.

11. The pump of claim 10 wherein said at least one lubricating groove extends radially.

12. The pump of claim 10 wherein said at least one lubricating groove partially extends radially from an outer periphery of said stationary thrust bearing.

13. The pump of claim 10 wherein said at least one lubricating groove extends angularly so as to be substantially tangential to said shaft and oriented in a direction opposite that of said rotatable thrust bearing.

14. The pump of claim 10 including at least one evacuating hole extending through said rotatable thrust bearing, said hole slanting upwardly and outwardly from a position adjacent said shaft.

* * * * *